United States Patent
Kamada

(10) Patent No.: US 9,834,043 B2
(45) Date of Patent: Dec. 5, 2017

(54) RUN FLAT TIRE

(71) Applicant: Toyo Tire & Rubber Co., Ltd., Osaka-shi, Osaka (JP)

(72) Inventor: Shinsaku Kamada, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 142 days.

(21) Appl. No.: 14/750,265

(22) Filed: Jun. 25, 2015

(65) Prior Publication Data
US 2016/0009146 A1    Jan. 14, 2016

(30) Foreign Application Priority Data

Jul. 14, 2014   (JP) .................................. 2014-144379

(51) Int. Cl.
*B60C 17/00*  (2006.01)
*B60C 17/04*  (2006.01)
(Continued)

(52) U.S. Cl.
CPC .......... *B60C 17/0009* (2013.01); *B60C 15/06* (2013.01); *B60C 2001/0033* (2013.01);
(Continued)

(58) Field of Classification Search
CPC ....... B60C 1/00; B60C 17/00; B60C 17/0009; B60C 17/0018
See application file for complete search history.

(56) References Cited

U.S. PATENT DOCUMENTS

| 5,131,445 A | 7/1992 | Tokieda et al. |
| 5,253,691 A | 10/1993 | Scriver |

(Continued)

FOREIGN PATENT DOCUMENTS

| CN | 101407603 A | 4/2009 |
| CN | 101484311 A | 7/2009 |

(Continued)

OTHER PUBLICATIONS

Office Action dated Jun. 29, 2016, issued in Chinese Patent Application 201510159519.9, with abridged English translation. (10 pages).

(Continued)

*Primary Examiner* — Justin Fischer
(74) *Attorney, Agent, or Firm* — Westerman, Hattori, Daniels & Adrian, LLP

(57) ABSTRACT

A run flat tire having a side reinforcing rubber part is disclosed. The side reinforcing rubber part is formed by a rubber composition having a ratio (M50H/M50N) of tensile stress (M50H) in 50% elongation at a measurement temperature of 100° C. to tensile stress (M50N) in 50% elongation at a measurement temperature of 23° C. of from 1.0 to 1.3. A cushion rubber layer interposed between the side reinforcing rubber part and a bead filler is provided, and tensile stress in 50% elongation at a measurement temperature of 23° C. of a rubber composition forming the cushion rubber layer is larger than tensile stress in 50% elongation at a measurement temperature of 23° C. of the rubber composition forming the side reinforcing rubber part, and is smaller than tensile stress in 50% elongation at a measurement temperature of 23° C. of a rubber composition forming the bead filler.

12 Claims, 1 Drawing Sheet

(51) Int. Cl.
  *B60C 1/00* (2006.01)
  *B60C 15/00* (2006.01)
  *B60C 15/06* (2006.01)

(52) U.S. Cl.
  CPC .......... *B60C 2015/0617* (2013.01); *B60C 2017/0063* (2013.01)

(56) References Cited

U.S. PATENT DOCUMENTS

| | | | |
|---|---|---|---|
| 5,464,899 A * | 11/1995 | Freeman | B60C 1/0025 |
| | | | 152/517 |
| 5,859,101 A | 1/1999 | Kikkawa et al. | |
| 6,196,289 B1 * | 3/2001 | Yoshioka | B60C 15/0045 |
| | | | 152/517 |
| 6,494,242 B2 * | 12/2002 | Cottrell | B60C 15/0018 |
| | | | 152/454 |
| 7,900,667 B2 | 3/2011 | Vasseur | |
| 2006/0219343 A1 | 10/2006 | Hochi | |
| 2008/0295941 A1 | 12/2008 | Shiraishi | |
| 2009/0095394 A1 | 4/2009 | Kameda | |
| 2010/0112365 A1 | 5/2010 | Obrecht et al. | |
| 2011/0172339 A1 | 7/2011 | Satou | |
| 2011/0290396 A1 | 12/2011 | Nakagawa et al. | |
| 2012/0152425 A1 | 6/2012 | Kawashima et al. | |
| 2013/0037193 A1 | 2/2013 | Horiuchi | |
| 2013/0158163 A1 | 6/2013 | Yagi et al. | |
| 2015/0306921 A1 | 10/2015 | Hiraiwa | |

FOREIGN PATENT DOCUMENTS

| | | | |
|---|---|---|---|
| CN | 102264552 A | | 11/2011 |
| CN | 103124765 A | | 5/2013 |
| CN | 103374151 A | | 10/2013 |
| JP | S58-122946 A | | 7/1983 |
| JP | H03-176213 A | | 7/1991 |
| JP | 2001-80319 A | | 3/2001 |
| JP | 2004-276699 A | | 10/2004 |
| JP | 2007-70373 A | | 3/2007 |
| JP | 2007-331422 A | | 12/2007 |
| JP | 2008-189911 A | | 8/2008 |
| JP | 2010-132168 A | | 6/2010 |
| JP | 2010-149632 A | | 7/2010 |
| JP | 2010-285514 A | | 12/2010 |
| JP | 2011-89031 A | | 5/2011 |
| JP | 2011-190410 A | | 9/2011 |
| JP | 2012-251017 | * | 12/2012 |
| JP | 2012-251017 A | | 12/2012 |
| JP | 2013-216753 A | | 10/2013 |
| JP | 2013-224054 A | | 10/2013 |
| JP | 2013221052 A | | 10/2013 |
| WO | 2010/074286 A1 | | 7/2010 |

OTHER PUBLICATIONS

Office Action dated Nov. 22, 2016, issued in Chinese Application No. 201510419572.8, with machine tranlsation. (10 pages).
Office Action dated Sep. 30, 2016, issued in Chinese Application No. 201510289327.X, with English translation. (10 pages).
Non-Final Office Action dated Mar. 3, 2017, issued in U.S. Appl. No. 14/702,904 (6 pages).
Non-Final Office Action dated Mar. 3, 2017, issued in U.S. Appl. No. 14/721,442 (6 pages).
Non-Final Office Action dated Apr. 6, 2017, issued in U.S. Appl. No. 14/813,525 (8 pages).
Final Office Action dated Sep. 28, 2016, issued in U.S. Appl. No. 14/813,525 (10 pages).
Non-Final Office Action dated Apr. 8, 2016, issued in U.S. Appl. No. 14/813,525 (10 pages).
Non-Final Office Action dated Feb. 21, 2017, issued in U.S. Appl. No. 14/669,561 15 pages.
Final Office Action dated Jun. 7, 2017, issued in U.S. Appl. No. 14/669,561.
Office Action dated Jul. 18, 2017, issued in Japanese Patent Application No. 2014-090478 with translation, counterpart of U.S. Appl. No. 14/669,561.
Notice of Allowance dated Aug. 2, 2017, issued in U.S. Appl. No. 14/813,525.
Office Action dated Aug. 8, 2017, issued in Chinese Patent Application 201510419572.8, with machine translation, counter part of U.S. Appl. No. 14/813,525.
(Supplementary) Notice of Allowance dated Sep. 18 2017, issued in U.S. Appl. No. 14/813,525.

* cited by examiner

RUN FLAT TIRE

CROSS-REFERENCE TO RELATED APPLICATIONS

This application is based upon and claims the benefit of priority from the prior Japanese Patent Application No. 2014-144379, filed on Jul. 14, 2014; the entire contents of which are incorporated herein by reference.

BACKGROUND

1. Technical Field

The present invention relates to a run flat tire.

2. Related Art

There is a pneumatic tire called a run flat tire that can run in a certain extent of distance even in the state that air pressure in a tire has reduced and reached 0 kPa by tire failure such as puncture. It is known to reinforce a side wall part by providing a side reinforcing rubber part on an inner surface of the side wall part as a technique for enabling run flat running in the state that an inner pressure has reduced as above (see JP-A-2013-224054, JP-A-2007-331422 and US2013/0037193A1).

Furthermore, JP-A-2013-224054 discloses that a rubber sheet is arranged along a turn-up part of a carcass ply in order to improve run flat durability in a bead part of a run flat tire. US2013/0037193A1 discloses that a side filler having a given 100% tensile stress is embedded at an outer wall surface side of a side wall part.

In a run flat tire of such a side reinforcing type, high rigidity rubber is used in a side reinforcing rubber part in order to suppress deformation of a tire during run flat running. However, a temperature of a side reinforcing rubber part is increased during run flat running, and as a result, rigidity of the side reinforcing rubber part is decreased, resulting in decrease of run flat durability.

SUMMARY

A side reinforcing rubber part is required to suppress decrease of its rigidity at high temperature in order to improve run flat durability. It is also considered that the factor of decreasing run flat durability is great difference of tensile stress between a side reinforcing rubber part and a bead filler. The difference of tensile stress invites stress concentration on this portion, and this leads to failure in a bead part during run flat running. For example, when stress is concentrated on an interface between a carcass ply sandwiched between a side reinforcing rubber part and a bead filler, and the bead filler, separation occurs between the side reinforcing rubber part and the bead filler, and run flat durability is sometimes decreased. For this reason, it is required to reduce stress concentration between the side reinforcing rubber part and the bead filler.

The present invention has been made in view of the above circumstances and has an object to provide a run flat tire having excellent run flat durability.

The run flat tire according to the present embodiment comprises a tread part, a pair of side wall parts extending inside in a radial direction from both ends of the tread part, a pair of bead parts provided inside in a radial direction of the side wall part, a pair of ring-shaped bead cores provided in the bead parts, a carcass ply extending in a toroidal shape between a pair of the bead cores, a bead filler provided on the periphery of the bead core, a side reinforcing rubber part provided in the side wall part and reinforcing the side wall part, and a cushion rubber layer interposed between the side reinforcing rubber part and the bead filler. The side reinforcing rubber part is formed by a rubber composition in which a ratio (M50H/M50N) of tensile stress (M50H) in 50% elongation at a measurement temperature of 100° C. to tensile stress (M50N) in 50% elongation at a measurement temperature of 23° C. is from 1.0 to 1.3. Tensile stress in 50% elongation at a measurement temperature of 23° C. of a rubber composition forming the cushion rubber layer is larger than tensile stress in 50% elongation at a measurement temperature of 23° C. of the rubber composition forming the side reinforcing rubber part, and is smaller than tensile stress in 50% elongation at a measurement temperature of 23° C. of a rubber composition forming the bead filler.

DETAILED DESCRIPTION

Figure 1:
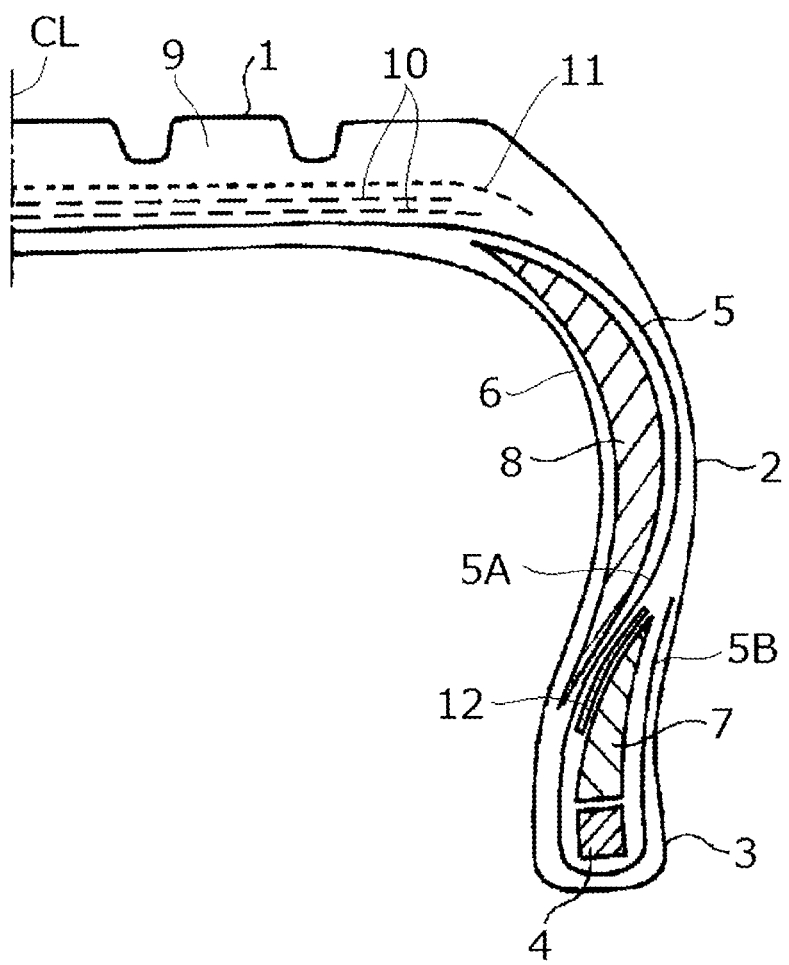
FIG. 1 is a half cross-sectional view of a run flat tire according to one embodiment.

As shown in FIG. 1, the run flat tire according to one embodiment is a pneumatic radial tire for passenger cars, and comprises a tread part (1), a pair of left and right side wall parts (2) extending inside in a radial direction from both ends of the tread part, and a pair of left and right bead parts (3) provided inside in a radial direction of the side wall part (2). Ring-shaped bead cores (4) are embedded in a pair of bead parts (3), respectively. In FIG. 1, CL indicates a tire equator. In this embodiment, the tire has a left-right symmetrical structure to the tire equator CL.

At least one carcass ply (5) extending in a toroidal shape between a pair of the bead cores (4) is embedded in the tire. In this embodiment, one carcass ply (5) is used, but two or more carcass plies may be provided. The carcass ply (5) extends to the bead part (3) via the side wall part (2) from the tread part (1), and is locked by turning up the end of the carcass ply (5) around the bead core (4) in the bead part (3). In this embodiment, the end of the carcass ply (5) is locked by folding outside from the inside in a tire width direction around the bead core (4). The carcass ply (5) comprises a carcass cord comprising an organic fiber cord or the like, and a covering rubber for covering the carcass cord. The carcass cord is arranged at substantially right angle to a tire circumferential direction. An inner liner layer (6) for maintaining air pressure is provided at a tire inner surface side of the carcass ply (5).

Bead filler (7) made of hard rubber is provided on the periphery (that is, periphery side in a radial direction) of the bead core (4) between a main part (5A) and a turn-up part (5B) of the carcass ply (5). The bead filler (7) has a triangular cross-sectional shape formed such that its width is gradually narrowed toward an outer side in a radial direction.

Side reinforcing rubber parts (8) called side pads are provided in a pair of the side wall parts (2), respectively, in order to increase its rigidity. The side reinforcing rubber part (8) is provided at a tire inner surface side of the carcass ply (5) in the side wall part (2), and in this embodiment, is sandwiched between the carcass ply (5) and the inner liner layer (6). The side reinforcing rubber part (8) is formed such that the thickness thereof is large at a central part in a radial direction of the side wall part (2) and the thickness is gradually decreased toward the tread part (1) side and the bead part (3) side from the central part, respectively, and has a crescent cross-sectional shape in a tire meridian cross-section as shown in FIG. 1.

The side reinforcing rubber part (8) extends inside in a radial direction over a tip (that is, outer edge in a radial direction) of the bead filler (7). Therefore, the side reinforcing rubber part (8) and the bead filler (7) overlap with each other in a tire radial direction. In the overlapped portion, the side reinforcing rubber part (8) and the bead filler (7) are adjacent to each other sandwiching the main part (5A) of the carcass ply (5) therebetween. Therefore, the carcass ply (5) extends inside in a tire radial direction passing between the side reinforcing rubber part (8) and the bead filler (7).

Belt (10) comprising at least two belt plies is provided between the carcass ply (5) and a tread rubber part (9) at the periphery side in a radial direction of the carcass ply (5) in the tread part (1). Furthermore, a belt reinforcing layer (11) is provided at the periphery side of the belt (10)

In the run flat tire according to the present embodiment, the side reinforcing rubber part (8) reinforcing the side wall part (2) is formed using a rubber composition having noble properties that improve run flat durability. In the rubber composition, when tensile stress in 50% elongation at a measurement temperature of 23° C. is M50N and tensile stress in 50% elongation at a measurement temperature of 100° C. is M50H, M50H/M50N that is a ratio of those satisfies the following relationship. That is, in the rubber composition constituting the side reinforcing rubber part (8), properties of a vulcanized rubber satisfy the following relationship.

$$1.0 \leq M50H/M50N \leq 1.3$$

When the rubber composition having the above properties is used, the side reinforcing rubber part (8) having the same properties is obtained, deformation of a side wall part during run flat running is suppressed while maintaining running performance (for example, running performance to run over a rut) during normal running, and run flat durability can be improved.

In detail, modulus of elasticity is decreased at high temperature in a high hardness compounded rubber composition generally used in a side reinforcing rubber part of a run flat tire. Inverting this relationship, a rubber composition in which tensile stress at high temperature (100° C.) corresponding to a temperature during run flat running is the same as or more than tensile stress at ordinary temperature (23° C.) corresponding to a temperature during normal running is used in the present embodiment. When M50H/M50N is 1.0 or more, decrease of rigidity during run flat running is suppressed, and run flat durability can be improved. More preferably, tensile stress at high temperature is higher than tensile stress at ordinary temperature, that is, M50H/M50N>1.0, and still more preferably, M50H/M50N is 1.1 or more. On the other hand, where M50H/M50N is too large, rigidity at high temperature becomes too high, and run flat durability is rather deteriorated. Therefore, M50H/M50N is preferably less than 1.3, and more preferably 1.2 or less.

When the tensile stress (M50H) in 50% elongation at a measurement temperature of 100° C. of the rubber composition forming a side reinforcing rubber part is 3.5 MPa or more, it is preferred in that rigidity of a side wall part at high temperature is increased, thereby improving run flat durability. The lower limit of M50H is more preferably 4.0 MPa or more. The upper limit of M50H is not particularly limited, and is preferably 5.5 MPa or less, and more preferably 5.3 MPa or less. Setting M50H to the above upper limit suppresses the phenomenon that rigidity at high temperature is too high and a side wall part becomes difficult to warp. As a result, run flat durability can be improved. Tensile stress (M50N) in 50% elongation at a measurement temperature of 23° C. of the rubber composition is not particularly limited. To maintain running performance during normal running in good state, the tensile stress is preferably from 3.0 to 5.0 MPa. More preferably, the lower limit is 3.5 MPa or more, and the upper limit is 4.5 MPa or less.

Various rubber compositions comprising a blend of a rubber component comprising a diene rubber, and a filler, and having the above-described properties of a vulcanized rubber can be used in the side reinforcing rubber part (8). The rubber composition for a side reinforcing rubber part according to one embodiment comprises a rubber component containing natural rubber (NR) and polybutadiene rubber (BR), a phenol type thermosetting resin and a methylene donor as its hardener, and a mass ratio of the amount of the phenol type thermosetting resin to the amount of the methylene donor is 1.5 times or more.

The natural rubber and polybutadiene rubber as the rubber component are not particularly limited and rubbers generally used in rubber industries can be used as the natural rubber and polybutadiene rubber. Ratio of those rubbers contained in the rubber component is not particularly limited, and for example, the content of the natural rubber may be from 20 to 70 mass %, and may be from 30 to 60 mass %. The content of the polybutadiene rubber may be from 30 to 80 mass %, and may be from 40 to 70 mass %. Tear resistance can be improved by increasing the content of natural rubber. Bending fatigue resistance can be improved by increasing the content of polybutadiene rubber.

The rubber component may be constituted of only natural rubber and polybutadiene rubber, and may contain other diene rubber. The other diene rubber is not particularly limited, and examples thereof include styrene-butadiene rubber (SBR), acrylonitrile-butadiene rubber (NBR) and chloroprene rubber (CR).

Examples of the phenol type thermosetting resin used include thermosetting resins obtained by condensation of at least one phenol compound selected from the group consisting of phenol, resorcin and those alkyl derivatives with aldehyde such as formaldehyde, and use of the resin can help to increase hardness. The alkyl derivatives include derivatives by relatively long-chain alkyl group, such as nonyl phenol or octyl phenol, in addition to methyl group derivatives such as cresol or xylenol. Specific examples of the phenol type thermosetting resin include various novolac type phenol resins such as an unmodified phenol resin obtained by condensation of phenol and formaldehyde (straight phenol resin), an alkyl-substituted phenol resin obtained by condensation of an alkyl phenol such as cresol, xylenol or octyl phenol and formaldehyde, a resorcin-formaldehyde resin obtained by condensation of resorcin and formaldehyde, and a resorcin-alkyl phenol copolycondensated formaldehyde resin obtained by condensation of resorcin, alkyl phenol and formaldehyde. Furthermore, for example, an oil-modified novolac type phenol resin obtained by modification with at least one oil selected from the group consisting of a cashew nutshell oil, a tall oil, a rosin oil, a linoleic acid oil, oleic acid and linolenic acid can be used. Those phenol type thermosetting reins may be used in any one kind alone and may be used as mixtures of two or more kinds.

Hexamethylenetetramine and/or melamine derivative are used as the methylene donor contained as a hardener of the phenol type thermosetting resin. The melamine derivative includes at least one selected from the group consisting of hexamethoxymethylmelamine, hexamethylolmelamine pentamethyl ether and polyhydric methylolmelamine. Of those, hexamethoxymethylmelamine and/or hexamethylenetetramine are preferred as the methylene donor, and hexamethoxymethylmelamine is more preferred.

The amount (A) of the phenol type thermosetting resin added is A/B≥1.5 in terms of a mass ratio to the amount (B) of the methylene donor added. When the proportion of the methylene donor as a hardener is too large, the proportion may adversely affect crosslinking system of a rubber. When those are used in appropriate amounts, M50H/M50N ratio is easily set to the above range, the effect of suppressing deformation of a tire during run flat running is increased, and run flat durability can be improved. A/B is more preferably 2.0 or more, and still more preferably 2.5 or more. The upper limit of A/B is preferably 7.0 or less, more preferably 5.0 or less, and still more preferably 4.0 or less.

The amount of the phenol type thermosetting resin added is not particularly limited, and is preferably from 1 to 20 parts by mass, and more preferably from 1 to 10 parts by mass, per 100 parts by mass of the rubber component. The amount of the methylene donor added is not particularly limited, and is preferably from 0.2 to 10 parts by mass, and more preferably from 0.5 to 5 parts by mass, per 100 parts by mass of the rubber component.

The rubber composition for a side reinforcing rubber part may contain a quinoline type age resister and at least one age resister other than the quinoline type age resister. When two or more kinds of those age resisters are added, run flat durability can be improved.

The quinoline type age resister includes at least one selected from the group consisting of a 2,2,4-trimethyl-1,2-dihydroquinoline polymer (TMDQ) and 6-ethoxy-2,2,4-trimethyl-1,2-dihydroquinoline (ETMDQ).

Other age resister used together with the quinoline type age resister includes at least one age resister selected from the group consisting of an aromatic secondary amine type age resister, a phenol type age resister, a sulfur type age resister and a phosphite type age resister.

Examples of the aromatic secondary amine type age resister include p-phenylenediamine type age resisters such as N-phenyl-N'-(1,3-dimethylbutyl)-p-phenylenediamine (6PPD), N-isopropyl-N'-phenyl-p-phenylenediamine (IPPD), N,N'-diphenyl-p-phenylenediamine (DPPD), N,N'-di-2-naphthyl-p-phenylenediamine (DNPD), N-(3-methacryloyloxy-2-hydroxypropyl)-N'-phenyl-p-phenylenediamine or N-cyclohexyl-N'-phenyl-p-phenylenediamine; diphenylamine type age resisters such as p-(p-toluenesulfonylamide)diphenylamine, 4,4'-bis($\alpha,\alpha$-dimethylbenzyl)diphenylamine (CD), octylated diphenylamine (ODPA) or styrenated diphenylamine; and naphthylamine type registers such as N-phenyl-1-naphthylamine (PAN) or N-phenyl-2-naphthylamine (PBN). Those can be used in one kind alone or as mixtures of two or more kinds.

Examples of the phenol type age resisters include monophenol type age resisters such as 2,6-di-tert-butyl-4-methylphenol (DTBMP) or styrenated phenol (SP); bisphenol type age resisters such as 2,2'-methylene-bis(4-methyl-6-tert-butylphenol) (MBMBP), 2,2'-methylene-bis(4-ethyl-6-tert-butylphenol) (MBETB), 4,4'-butylidene-bis(3-methyl-6-tert-butylphenol) (BBMTBP) or 4,4'-thio-bis(3-methyl-6-tert-butylphenol) (TBMTBP); and hydroquinone type age resisters such as 2,5-di-tert-butylhydroquinone (DBHQ) or 2,5-di-tert-amylhydroquinone (DAHQ). Those can be used in one kind alone or as mixtures of two or more kinds.

Examples of the sulfur type age resister include benzimidazole type age resisters such as 2-mercaptobenzimidazole, 2-mercaptomethylbenzimidazole or a zinc salt of 2-mercaptobenzimidazole; dithiocarbamate type age resisters such as nickel dibutylthiocarbamate; thiourea type age resisters such as 1,3-bis(dimethylaminopropyl)-2-thiourea or tributylthiourea; and organic thioacid type age resisters such as dilauryl thiodipropionate. The phosphite type age resister includes tris(nonylphenyl)phosphite. Those can be used in one kind alone or as mixtures of two or more kinds.

Of the above, the aromatic secondary amine type age resister is preferred as the other age resister used together with the quinoline type age resister, and p-phenylenediamine type age resister is more preferred.

The amount of the quinoline type age resister added is preferably 20 mass % or more based on the total amount of the age resisters, and improvement effect of run flat durability can be increased. The amount is more preferably 25 mass % or more, and still more preferably 30 mass % or more. The upper limit of the amount is preferably 80 mass % or less, and more preferably 75 mass % or less. The total amount of the age resisters added, that is, the total of the amount of the quinoline type age resister and the amount of the other age resister, is preferably from 1 to 10 parts by mass, more preferably from 1.5 to 7 parts by mass, and still more preferably from 2 to 5 parts by mass, per 100 parts by mass of the rubber component. The amount of the quinoline type age resister added is preferably from 0.2 to 8 parts by mass, and more preferably from 0.5 to 4 parts by mass, per 100 parts by mass of the rubber component.

The rubber composition for a side reinforcing rubber part can contain a filler such as carbon black and/or silica. The amount of the filler added is preferably from 20 to 100 parts by mass, more preferably from 30 to 80 parts by mass, and still more preferably from 50 to 70 parts by mass, per 100 parts by mass of the rubber component. The filler is preferably carbon black alone or a blend of carbon black and silica, and more preferably carbon black. The value of tensile stress of the rubber composition can be controlled by the kind and amount of the filler added.

Carbon black is not particularly limited, and carbon blacks ISAF Grade (N200s), HAF Grade (N300s), FEF Grade (N500s) and GPF Grade (N600s) (all is ASTM Grade) can be used. Carbon black FEF Grade is more preferred.

The rubber composition for a side reinforcing rubber part can contain various additives generally used in a rubber composition for a tire, such as an oil, zinc flower, stearic acid, a wax, a vulcanizing agent and a vulcanization accelerator, other than the components described above. The vulcanizing agent includes a sulfur component such as powdered sulfur, precipitated sulfur, colloidal sulfur, insoluble sulfur and highly dispersible sulfur. Although not particularly limited, the amount of the vulcanizing agent added is preferably from 0.1 to 10 parts by mass, more preferably from 0.5 to 8 parts by mass, and still more preferably from 1 to 5 parts by mass, per 100 parts by mass of the rubber component. The amount of the vulcanization accelerator added is preferably from 0.1 to 7 parts by mass, and more preferably from 0.5 to 5 parts by mass, per 100 parts by mass of the rubber component.

The rubber composition for a side reinforcing rubber part can be prepared by kneading necessary components according to the conventional method using a mixing machine such as Banbury mixer, kneader or rolls, generally used. Furthermore, the side reinforcing rubber part (8) comprising the rubber composition can be formed by vulcanization molding a tire at, for example, from 140 to 180° C. according to the conventional method. The rubber composition contains the phenol type thermosetting resin and the methylene donor in the mass ratio described above, and further contains at least two kinds of age resistors including a quinoline type age resister. This embodiment increases tensile stress at high temperature, making it easy to set the M50H/M50N ratio to the above-described range, and can remarkably improve run flat durability.

In the run flat tire according to the present embodiment, a cushion rubber layer (12) interposed between the side reinforcing rubber part (8) and the bead filler (7) is provided as shown in FIG. 1. In this example, the cushion rubber layer (12) is interposed between the carcass ply (5) and the bead filler (7), between the side reinforcing rubber part (8) and the bead filler (7), and is provided along the inner surface in a tire width direction of the bead filler (7). The cushion rubber layer (12) can be formed by arranging so as to sandwich a rubber tape (called a rubber sheet) between a main part (5A) of the carcass ply (5) and the bead filler (7).

In this example, the cushion rubber layer (12) is exclusively provided on the overlapped portion of the side reinforcing rubber part (8) and the bead filler (7), but may be provided over the entire height direction (tire radial direction) of the bead filler (7) if the overlapped portion is included. Furthermore, the cushion rubber layer is not limited to the embodiment that the cushion rubber layer (12) is sandwiched between the carcass ply (5) and the bead filler (7), but the cushion rubber layer (12) may be interposed between the carcass ply (5) and the side reinforcing rubber part (8), between the side reinforcing rubber part (8) and the bead filler (7), and can provided between the carcass ply (5) and the bead filler (7) as well as between the carcass ply (5) and the side reinforcing rubber part (8).

The cushion rubber layer (12) has a thickness of preferably from 0.3 to 2.0 mm, and more preferably from 0.5 to 1.5 mm. When the thickness is 0.3 mm or more, stress relaxation effect is increased, thereby run flat durability can be improved. When the thickness is 2.0 mm or less, decrease of rigidity is suppressed, thereby run flat durability can be improved.

In the run flat tire according to the present embodiment, when tensile stress in 50% elongation at a measurement temperature of 23° C. of a rubber composition forming a cushion rubber layer is M50B, tensile stress in 50% elongation at a measurement temperature of 23° C. of a rubber composition forming a side reinforcing rubber part is M50N and tensile stress in 50% elongation at a measurement temperature of 23° C. of a rubber composition forming a bead filler is M50F, those satisfy the following relationship. That is, properties of vulcanized rubbers of rubber compositions constituting the side reinforcing rubber part (8), the bead filler (7) and the cushion rubber layer (12) respectively satisfy the following relationship.

M50N<M50B<M50F

By this, the side reinforcing rubber part (8), the bead filler (7) and the cushion rubber layer (12) satisfy the properties described above. That is, the rubber layer (12) having modulus between modulus of the side reinforcing rubber part (8) and that of the bead filler (7) is interposed between the side reinforcing rubber part (8) and the bead filler (7). Therefore, the rubber layer (12) acts as a cushioning, and stress concentration between the side reinforcing rubber part (8) and the bead filler (7) can be reduced. As a result, separation between the side reinforcing rubber part (8) and the bead filler (7) can be suppressed, and run flat durability can be improved. Furthermore, fitting force to a rim during run flat running can be improved by arranging the cushion rubber layer (12) to suppress movement, and rim detachment resistance can be improved by suppressing rim detachment in which a bead part detaches from a rim. The value of M50F may be 5.0 MPa or more, may be from 5.5 to 10.0 MPa, and may be from 6.0 to 9.0 MPa. The value of M50B may be from 4.5 to 8.5 MPa, may be from 5.0 to 7.5 MPa, and may be from 5.0 to 7.0 MPa.

Examples of the rubber composition for a bead filler and the rubber composition for a cushion rubber layer include various rubber compositions comprising a rubber component comprising a diene rubber, and a filler, and having the above-described properties of a vulcanized rubber. The rubber component of the rubber composition for a bead filler preferably comprises natural rubber, or natural rubber and styrene-butadiene rubber. As one embodiment, the rubber component comprises preferably from 75 to 100 mass % of natural rubber and from 25 to 0 mass % of styrene-butadiene rubber (SBR), and more preferably from 85 to 100 mass % of natural rubber and from 15 to 0 mass % of SBR. The rubber component of the rubber composition for a cushion rubber layer preferably comprises natural rubber and SBR. As one embodiment, the rubber component comprises preferably from 70 to 95 mass % of natural rubber and from 30 to 5 mass % of SBR, and more preferably from 80 to 95 mass % of natural rubber and from 20 to 5 mass % of SBR.

The filler of the rubber composition for a bead filler and rubber composition for a cushion rubber can use, for example, carbon black and/or silica. More preferably, the filler comprises carbon black, or carbon black and silica. The amount of the filler added may be from 30 to 120 parts by mass, and may be from 50 to 100 parts by mass, per 100 parts by mass of the rubber component.

The above-mentioned phenol type thermosetting resin may be added to the rubber composition for a bead filler and the rubber composition for a cushion rubber layer, whereby rigidity can be increased. The amount of the phenol type thermosetting resin added is not particularly limited, and may be from 1 to 20 parts by mass, and may be from 5 to 15 parts by mass, per 100 parts by mass of the rubber component. Furthermore, the above-mentioned methylene donor may be added as a hardener of the phenol type thermosetting resin, together with the phenol type thermosetting resin.

The rubber composition for a bead filler and the rubber composition for a cushion rubber layer can contain various additives such as an oil, zinc flower, stearic acid, a wax, an age resister, a vulcanizing agent and a vulcanization accelerator, in addition to the components described above. The vulcanizing agent includes a sulfur component such as powdered sulfur, precipitated sulfur, colloidal sulfur, insoluble sulfur and highly dispersible sulfur. Although not particularly limited, the amount of the vulcanizing agent added is preferably from 0.5 to 10 parts by mass, and more preferably from 3 to 8 parts by mass, per 100 parts by mass of the rubber component. The amount of the vulcanization accelerator added is preferably from 0.5 to 7 parts by mass, and more preferably from 1 to 5 parts by mass, per 100 parts by mass of the rubber component. The values of the tensile stress (M50F and M50B) can be adjusted by the kind and amount of a filler added, the amount of the phenol type thermosetting resin added, and the amounts of a vulcanizing agent and a vulcanization accelerator added, and the like.

The rubber composition for a bead filler and the rubber composition for a cushion rubber layer can be prepared by kneading necessary components according to the conventional method using a mixing machine such as Banbury mixer, kneader or rolls, generally used. For example, the bead filler (7) and the cushion rubber layer (12) can be formed by vulcanization molding a tire at, for example, from 140 to 180° C. according to the conventional method. Therefore, the run flat tire according to one embodiment is obtained by preparing an unvulcanized tire using the rubber composition for a side reinforcing rubber part, the rubber composition for a bead filler and the rubber composition for a cushion rubber layer, and vulcanization molding the unvulcanized tire obtained.

EXAMPLES

The present invention is described in detail by reference to the following examples, but it should be understood that the invention is not construed as being limited to those examples.
Preparation and Evaluation of Rubber Composition Components excluding sulfur, a vulcanization accelerator and a methylene donor were mixed according to the formulation (parts by mass) shown in Table 1 below using Banbury mixer in a first step (nonproductive mixing step) (discharge temperature: 160° C.). Sulfur, a vulcanization accelerator and a methylene donor were then mixed with the thus-obtained mixture in a second step (final mixing step) (discharge temperature: 100° C.). Thus, a rubber composition for a side reinforcing rubber part was prepared. Similarly, a rubber composition for a cushion rubber layer was prepared according to the formulations (parts by mass) shown in Table 2 below, and a rubber composition for a bead filler was prepared according to the formulations (parts by mass) shown in Table 3 below.

Details of each component in Tables 1 to 3 are as follows.
NR: Natural rubber, RSS #3
BR: "BR01" manufactured by JSR Corporation
SBR: "SBR1502" manufactured by JSR Corporation
Carbon black 1: FEF, "DIABLACK E" manufactured by Mitsubishi Chemical Corporation
Carbon black 2: N550, "SEAST SO" manufacture by Tokai Carbon Co., Ltd.
Stearic acid: "LUNAC S-20" manufactured by Kao Corporation
Phenol type resin: Oil-modified novolac type phenol resin, "SUMILITE RESIN PR13349" manufactured by Sumitomo Bakelite Co., Ltd.
Zinc flower: "Zinc Flower Grade 1" manufactured by Mitsui Mining & Smelting Co., Ltd.
Oil: "JOMO PROCESS NC140" manufactured by JX Nippon Sun-Energy Corporation
Age resister 1: N-phenyl-N'-(1,3-dimethylbutyl)p-phenylenediamine, "ANTIGEN 6C" manufactured by Sumitomo Chemical Co., Ltd.
Age resister 2: 2,2,4-Trimethyl-1,2-dihydroquinoline polymer (TMDQ), "ANTAGE RD" manufactured by Kawaguchi Chemical Industry Co., Ltd.
Vulcanization accelerator 1: "NOCCELER NS-P" manufactured by Ouchi Shinko Chemical Industrial Co., Ltd.
Vulcanization accelerator 2: "Rhenogran HEXA-80/SBR" manufactured by Rhein Chemie Japan
Methylene donor: Hexamethoxymethylmelamine, "CYREZ 964RPC" manufactured by Mitsui Cytech Ltd.
Sulfur: "MU-CRON OT-20" manufactured by Shikoku Chemicals Corporation Using a test piece having a thickness of 2 mm vulcanized at 160° C. for 25 minutes of the rubber composition for a side reinforcing rubber part, tensile stress (M50N) in 50% elongation at 23° C. and tensile stress (M50H) in 50% elongation at 100° C. were measured by the following method, and a ratio of those (M50H/M50N) was obtained. Furthermore, using test pieces having a thickness of 2 mm vulcanized at 160° C. for 25 minutes of the rubber composition for a bead filler and the rubber composition for a cushion rubber layer, tensile stresses (M50F and M50B) in 50% elongation at 23° C. were measured.

Tensile stress in 50% elongation at 23° C.: According to JIS K6251, a test piece of dumbbell shape No. 3 was subjected to a tensile test at a room temperature of 23° C., and tensile stress in 50% elongation was obtained.

Tensile stress in 50% elongation at 100° C.: According to JIS K6251, a test piece of dumbbell shape No. 3 was maintained in a thermostat bath of 100° C. for 1 hour or more, a tensile test was then conducted in an atmosphere of 100° C. by a tensile tester equipped with a thermostat bath, and tensile stress in 50% elongation was obtained.

As shown in Table 1, in the formulation 1 that is a control, M50H/M50N that is a ratio between tensile stress at ordinary temperature and tensile stress at high temperature is 0.9, and rigidity was decreased at high temperature. In the formulation 2, as compared with the formulation 1, decrease of tensile stress at high temperature was not observed by increasing the amount of carbon black and adding a phenol type resin and a methylene donor, but increase of rigidity is too large, and M50H/M50N exceeded 1.3. In contrast, in the formulations 3 to 7 in which given amounts of a phenol type resin and a methylene donor were added and two or more kinds of age resisters including a quinoline type age resister were added, the ratio of M50H/M50N could be fallen within a range of from 1.1 to 1.2 by increasing tensile stress at high temperature.

TABLE 1

| | Formulation (parts by mass) | | | | | | |
|---|---|---|---|---|---|---|---|
| | Formulation 1 | Formulation 2 | Formulation 3 | Formulation 4 | Formulation 5 | Formulation 6 | Formulation 7 |
| NR | 40 | 40 | 40 | 40 | 40 | 40 | 30 |
| BR | 60 | 60 | 60 | 60 | 60 | 60 | 70 |
| Carbon black 1 | 60 | 65 | 60 | 60 | 60 | 65 | 60 |
| Stearic acid | 2 | 2 | 2 | 2 | 2 | 2 | 2 |
| Phenol type resin | | 3 | 3 | 7 | 3 | 3 | 3 |
| Zinc flower | 3 | 3 | 3 | 3 | 3 | 3 | 3 |
| Age resister 1 | 2 | 2 | 2 | 2 | 2 | 2 | 2 |
| Age resister 2 | | 2 | 2 | 2 | 1 | 4 | 2 |
| Vulcanization accelerator 1 | 2 | 2 | 2 | 2 | 2 | 2 | 2 |
| Methylene donor | | 5 | 1 | 2 | 1 | 1 | 1 |

TABLE 1-continued

| | Formulation (parts by mass) | | | | | | |
|---|---|---|---|---|---|---|---|
| | Formulation 1 | Formulation 2 | Formulation 3 | Formulation 4 | Formulation 5 | Formulation 6 | Formulation 7 |
| Sulfur | 4 | 4 | 4 | 4 | 4 | 4 | 4 |
| M50N (MPa) | 3.1 | 4.3 | 4.1 | 4.3 | 4.1 | 4.2 | 4.1 |
| M50H (MPa) | 2.8 | 6.0 | 4.5 | 5.1 | 4.5 | 5.0 | 4.5 |
| M50H/M50N | 0.9 | 1.4 | 1.1 | 1.2 | 1.1 | 1.2 | 1.1 |

TABLE 2

| | Formulation (parts by mass) | | | | | |
|---|---|---|---|---|---|---|
| | Formulation A | Formulation B | Formulation C | Formulation D | Formulation E | Formulation F |
| NR | 40 | 80 | 80 | 80 | 95 | 95 |
| SBR | | 20 | 20 | 20 | 5 | 5 |
| BR | 60 | | | | | |
| Oil | 15 | 15 | 5 | 5 | 5 | 5 |
| Carbon black 2 | 90 | 90 | 80 | 90 | 55 | 65 |
| Stearic acid | 2 | 2 | 2 | 2 | 2 | 2 |
| Phenol type resin | 2 | 7 | 7 | 7 | 20 | 20 |
| Zinc flower | 5 | 5 | 5 | 5 | 5 | 5 |
| Age resister 2 | 0.5 | 0.5 | 0.5 | 0.5 | 0.5 | 0.5 |
| Vulcanization accelerator 1 | 1.5 | 1.5 | 1.5 | 1.5 | 1.5 | 1.5 |
| Vulcanization accelerator 2 | 1.0 | 1.0 | 1.0 | 1.0 | 1.0 | 1.0 |
| Sulfur | 7.0 | 7.0 | 7.0 | 7.0 | 7.0 | 7.0 |
| M50B (MPa) | 2.1 | 5.1 | 5.7 | 6.8 | 8.1 | 9.2 |

TABLE 3

| Formulation (parts by mass) | Bead filler |
|---|---|
| NR | 95 |
| SBR | 5 |
| Carbon black 2 | 75 |
| Oil | 5 |
| Stearic acid | 2 |
| Zinc flower | 5 |
| Age resister 1 | 1 |
| Phenol type resin | 7 |
| Vulcanization accelerator 1 | 1.5 |
| Vulcanization accelerator 2 | 1.0 |
| Sulfur | 7.0 |
| M50F (MPa) | 8.9 |

Preparation and Evaluation of Tire

The rubber composition for a side reinforcing rubber part shown in Table 1, the rubber composition for a cushion rubber layer shown in Table 2, and the rubber composition for a bead filler shown in Table 3 were used as shown in Table 4 below, and a radial tire (tire size: 245/40ZR18) having the structure shown in FIG. 1 was vulcanization molded according to the conventional method. Each tire had the same constitution, except for a side reinforcing rubber part, a bead filler and a cushion rubber layer. One ply made of 21 ends of rayon cord (1840 dtex/3) for 25 mm was used as the carcass ply (5). In the carcass ply (5), the thickness of the covering rubber was 1.0 mm. Furthermore, the cushion rubber layer (12) was a rubber sheet having a thickness as shown in Table 4, and was interposed between the carcass ply (5) and the bead filler 7, between the side reinforcing rubber part (8) and the bead filler (7) as shown in FIG. 1.

Run flat durability, rim detachment resistance and running performance to run over a rut of each tire obtained were evaluated. Each evaluation method is as follows.

Run flat durability: Drum tester having a smooth surface and a diameter of 1,700 mm and made of steel was used. Tire inner pressure was 0 kPa, and load was 65% of loading capacity corresponding to load index. Speed was increased to 80 km/h in 5 minutes from test start, and a tire was run on the drum tester until tire failure occurs in a speed of 80 km/h. Running distance until the failure occurs was indicated by an index when the value of Comparative Example 1 was taken as 100. Larger index means that the run flat durability is more excellent.

Rim detachment resistance: A test tire was mounted on a left front wheel of an actual automobile (domestic 3,000 cc class FR passenger car), and a so-called J-turn running where the car first runs straight and then turns clockwise on a circular course having a radius of 20 m was conducted. Each tire has a run flat state having an inner pressure of 0 kPa, and rim detachment resistance was evaluated by running speed (proportional to horizontal G-force) when rim detachment occurred. Running was continued until rim detachment occurs in a manner of starting from running speed of 25 km/h and increasing the speed in a rate of 5 km/h. Rim detachment resistance was evaluated by an index when the value of Comparative Example 1 was taken as 100. A higher value shows that the running speed when rim detachment occurred is larger, that is, the rim detachment resistance is better.

Figure 2:
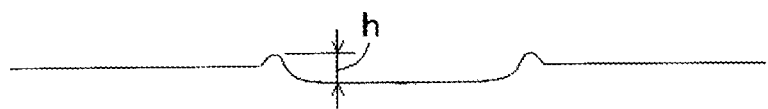
FIG. 2 is a cross-sectional view of a test road used in evaluation of running performance to run over a rut.

Running performance to run over a rut: Test tires having an inner pressure of 200 kPa and assembled to standard rims were mounted on front wheels of a test vehicle, and running performance of tires to run over a rut was sensorially evaluated on a test road (height difference of rut: 20 mm) having a cross-sectional shape shown in FIG. 2 that simulates a rut of general road. Tire that smoothly runs over a rut was defined as "a", a tire that is slightly difficult to run over a rut was defined as "b", and a tire that is difficult to run over a rut was defined as "c".

The results obtained are shown in Table 4 below.

TABLE 4

| | Com. Ex. 1 | Com. Ex. 2 | Com. Ex. 3 | Com. Ex. 4 | Com. Ex. 5 | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|---|---|---|
| Side reinforcing rubber part | | | | | | | | | | | | | | | | |
| Formulation | 4 | 4 | 4 | 1 | 2 | 4 | 4 | 4 | 4 | 3 | 4 | 4 | 4 | 5 | 6 | 7 |
| M50H/M50N | 1.2 | 1.2 | 1.2 | 0.9 | 1.4 | 1.2 | 1.2 | 1.2 | 1.2 | 1.1 | 1.2 | 1.2 | 1.2 | 1.1 | 1.2 | 1.1 |

TABLE 4-continued

|  | Com. Ex. 1 | Com. Ex. 2 | Com. Ex. 3 | Com. Ex. 4 | Com. Ex. 5 | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|---|---|---|
| M50N (MPa) | 4.3 | 4.3 | 4.3 | 3.1 | 4.3 | 4.3 | 4.3 | 4.3 | 4.3 | 4.1 | 4.3 | 4.3 | 4.3 | 4.1 | 4.2 | 4.1 |
| Cushion rubber layer |  |  |  |  |  |  |  |  |  |  |  |  |  |  |  |  |
| Formulation | — | A | F | C | C | B | C | D | E | C | C | C | C | C | C | C |
| M50B (MPa) | — | 2.1 | 9.2 | 5.7 | 5.7 | 5.1 | 5.7 | 6.8 | 8.1 | 5.7 | 5.7 | 5.7 | 5.7 | 5.7 | 5.7 | 5.7 |
| Thickness (mm) | — | 1.0 | 1.0 | 1.0 | 1.0 | 1.0 | 1.0 | 1.0 | 1.0 | 1.0 | 0.3 | 1.5 | 2.0 | 1.5 | 1.5 | 1.5 |
| Bead filler |  |  |  |  |  |  |  |  |  |  |  |  |  |  |  |  |
| M50F (MPa) | 8.9 | 8.9 | 8.9 | 8.9 | 8.9 | 8.9 | 8.9 | 8.9 | 8.9 | 8.9 | 8.9 | 8.9 | 8.9 | 8.9 | 8.9 | 8.9 |
| Run flat durability | 100 | 80 | 90 | 93 | 97 | 130 | 135 | 133 | 128 | 132 | 105 | 140 | 107 | 145 | 148 | 148 |
| Rim detachment resistance | 100 | 85 | 92 | 94 | 97 | 120 | 124 | 123 | 117 | 122 | 103 | 128 | 104 | 131 | 129 | 132 |
| Running performance to run over rut | a | a | a | a | a | a | a | a | a | a | a | a | a | a | a | a |

In Comparative Example 1, M50H/M50N of the side reinforcing rubber part was within the range, but since the cushion rubber layer was not provided, stress concentration could not be reduced between the side reinforcing rubber part and the bead filler. In Comparative Example 2, the cushion rubber layer was provided, but its tensile stress was too low and stress relaxation effect could not be obtained. As a result, improvement of run flat durability and rim detachment resistance was not obtained. In Comparative Example 3, tensile stress of the cushion rubber layer was too high, and stress relaxation effect was not obtained. In Comparative Example 4, the cushion rubber layer as specified was provided, but M50H/M50N of the side reinforcing rubber part was as small as 0.9, and run flat durability was poor. In Comparative Example 5, M50H/M50N of the side reinforcing rubber part was too large, and run flat durability was poor. In contrast, in Examples 1 to 11, run flat durability and rim detachment resistance could be remarkably improved without deterioration of running performance to run over a rut.

As described above, according to the present embodiment, the side reinforcing rubber part is constituted using the rubber composition having tensile stress at high temperature that is equal to or more than tensile stress at ordinary temperature. By this, excessive deformation of the side wall part can be suppressed during run flat running. Furthermore, the rubber layer having an intermediate tensile stress between that of the side reinforcing rubber part and that of the bead filler is interposed between the side reinforcing rubber part and the bead part. By this, the rubber layer functions as a cushion material, thereby stress concentration can be reduced and member separation between the side reinforcing rubber part and the bead filler can be suppressed. As a result, excellent run flat durability can be imparted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A run flat tire comprising a tread part, a pair of side wall parts extending inside in a radial direction from both ends of the tread part, a pair of bead parts provided inside in a radial direction of the side wall part, a pair of ring-shaped bead cores provided in the bead parts, a carcass ply extending in a toroidal shape between a pair of the bead cores, a bead filler provided on the periphery of the bead core, a side reinforcing rubber part provided in the side wall part and reinforcing the side wall part, and a cushion rubber layer interposed between the side reinforcing rubber part and the bead filler, wherein the side reinforcing rubber part is formed by a rubber composition in which a ratio (M50H/M50N) of tensile stress (M50H) in 50% elongation at a measurement temperature of 100° C. to tensile stress (M50N) in 50% elongation at a measurement temperature of 23° C. is from 1.0 to 1.3, tensile stress (M50B) in 50% elongation at a measurement temperature of 23° C. of a rubber composition forming the cushion rubber layer is larger than tensile stress (M50N) in 50% elongation at a measurement temperature of 23° C. of the rubber composition forming the side reinforcing rubber part, and is smaller than tensile stress (M50F) in 50% elongation at a measurement temperature of 23° C. of a rubber composition forming the bead filler, and wherein the bead filler is provided on the periphery of the bead core between a main part and a turn-up part of the carcass ply.

2. The run flat tire according to claim 1, wherein the tensile stress (M50H) in 50% elongation at a measurement temperature of 100° C. of the rubber composition forming the side reinforcing rubber part is 3.5 MPa or more.

3. The run flat tire according to claim 1, wherein the rubber composition forming the side reinforcing rubber part comprises a rubber component containing natural rubber and polybutadiene rubber, a phenol type thermosetting resin and a methylene donor as its hardener, and a mass ratio of the amount of the phenol type thermosetting resin to the amount of the methylene donor is from 1.5 to 4.0, the amount of the phenol type thermosetting resin is from 1 to 10 parts by mass, and the amount of the methylene donor is from 0.5 to 5 parts by mass, per 100 parts by mass of the rubber component.

4. The run flat tire according to claim 3, wherein the rubber component comprises from 20 to 70 mass % of a natural rubber and from 30 to 80 mass % of polybutadiene rubber.

5. The run flat tire according to claim 3, wherein the phenol type thermosetting resin is at least one selected from the group consisting of a straight phenol resin, an alkyl-substituted phenol resin, a resorcin-formaldehyde resin, a resorcin-alkyl phenol copolycondensated formaldehyde resin and oil-modified resins of those, and the methylene donor is at least one selected from the group consisting of hexamethylenetetramine, hexamethoxymethylmelamine, hexamethylolmelamine pentamethyl ether and polyhydric methylolmelamine.

6. The run flat tire according to claim 3, wherein the rubber composition forming the side reinforcing rubber part further comprises a quinoline type age resister and at least one age resister other than the quinoline type age resister.

7. The run flat tire according to claim 6, wherein the quinoline type age resister is at least one selected from the group consisting of 2,2,4-trimethyl-1,2-dihydroquinoline polymer and 6-ethoxy-2,2,4-trimethyl-1,2-dihydroquinoline, and at least one age resister other than the quinoline type age resister is an aromatic secondary amine type age resister.

8. The run flat tire according to claim 1, wherein the cushion rubber layer has a thickness of from 0.3 to 2.0 mm.

9. The run flat tire according to claim 1, wherein the carcass ply extends between the side reinforcing rubber part and the bead filler, and the cushion rubber layer is interposed between the carcass ply and the bead filler, between the side reinforcing rubber part and the bead filler.

10. The run flat tire according to claim 1, wherein the rubber composition forming the bead filler and the rubber composition forming the cushion rubber layer comprise 100 parts by mass of a rubber component comprising natural rubber or natural rubber and styrene-butadiene rubber, from 30 to 120 parts by mass of a filler, and from 1 to 20 parts by mass of a phenol type thermosetting resin.

11. The run flat tire according to claim 1, wherein the cushion rubber is provided substantially only on an overlapped portion of the side reinforcing rubber part and the bead filler.

12. The run flat tire according to claim 1, wherein the cushion rubber layer is formed by a rubber tape.

* * * * *